R. AUSTIN & W. H. GARDINER.
Fender.
No. 205,463. Patented July 2, 1878.
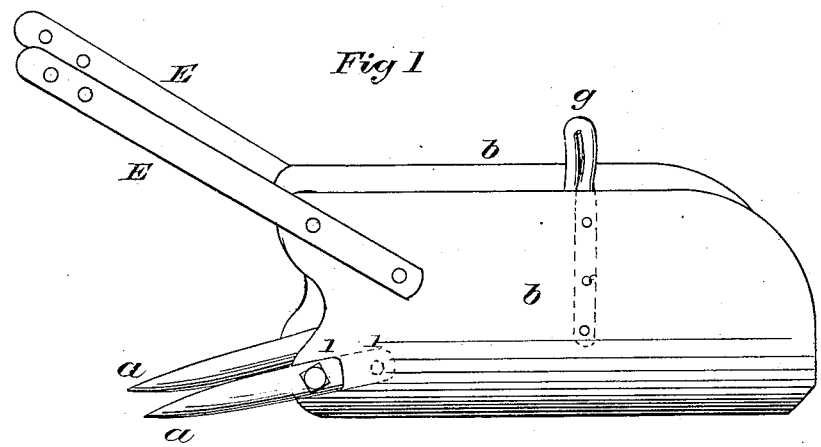
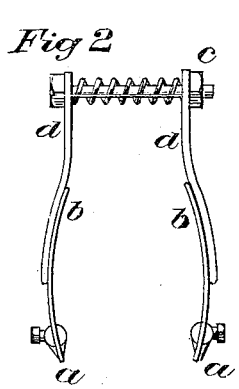
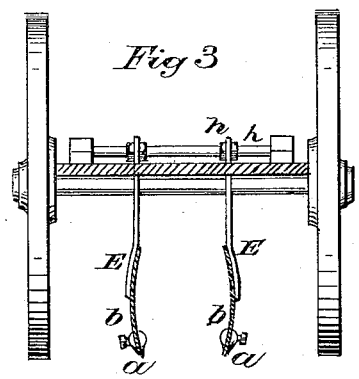
Witnesses:
H. Gardiner
Daniel W. Stevens
Inventor:
William H. Gardiner
Rufus Austin
by J. B. Staples
Atty.

United States Patent Office.

RUFUS AUSTIN AND WILLIAM H. GARDINER, OF HOWARDSVILLE, ILLINOIS.

IMPROVEMENT IN FENDERS.

Specification forming part of Letters Patent No. 205,463, dated July 2, 1878; application filed April 10, 1878.

*To all whom it may concern:*

Be it known that we, RUFUS AUSTIN and WILLIAM H. GARDINER, of Howardsville, Jo Daviess county, Rush township, in the State of Illinois, have invented a new and useful Improvement for a Cultivator Attachment, of which the following is a specification:

My invention consists in the construction of two similar sharp-pointed conically-shaped lifters, arranged in a pair, to operate at the same time on each side of the plants, and which are adjustably attached to fenders or shields which follow the lifters, the same being arranged in combination with a wheeled cultivator, so that the cultivator plows or hoes, operating at the same time on each side of the plants, will not cause injury to the plants.

In the accompanying drawing, Figure 1 represents, partly in perspective and partly in side elevation, said apparatus. Fig. 2 represents a vertical cross-section of same and the connecting-rod, spring, and nut. Fig. 3 represents an end elevation of the cultivator attachment, and axle and wheels of the cultivator-carriage.

In all the figures similar letters refer to similar parts.

The apparatus is constructed as follows: $a$ $a$ are two parallel teeth or lifters, pointed at the ends, and gradually enlarging or rising toward the opposite ends or bases, so as to very gently lift the leaves of the plants as they pass along under them. $b$ $b$ are two parallel shields, to the lower front parts of which the lifters $a$ $a$ are respectively attached by suitable bolts and screw-nuts 1. These are so arranged that the height of the lifters $a$ $a$ from the ground may be adjusted; and, also, so that an inclination downward, from base to point, may be given to the lifters if desired.

The shields $b$ $b$ are placed at such distance apart as the plants may require. They are held together by the vertical bars $d$ $d$, riveted at the lower ends to the shields, and at their upper ends connected by a screw bolt or rod, $c$. This rod is provided with a nut, so that by screwing back or forth the nut the distance between the two shields may be regulated, Fig. 2. A spiral spring placed upon the rod, and bearing against the uprights $d$ $d$, holds them apart at the distance regulated by the nut.

Instead of the upright bars $d$ $d$ and cross-rod, there may be substituted a bar, $g$, Fig. 1, bent in a bow, the lower ends of which are riveted to the shields, thus holding them together.

$e$ $e$ are two parallel draw-bars or supporters, which are placed at an incline, each one being secured to one of the shields by screw-bolts and nuts. The upper ends of $e$ $e$ are attached to the axle or cross-beam of the cultivator-carriage by a cross-rod, $h$, Fig. 3, which passes through openings in the upper ends of $e$ $e$. This rod is secured in its place by ring-bolts or any suitable fastening, and the ends of $e$ $e$ are held steady upon the rod by suitable screw-nuts and washers.

When the carriage and the attachment above described are put in motion, the operation of gently raising the leaves of the plants and holding them up by the shields safe from injury is performed while the cultivator-hoes are raising and upturning the earth about the plants.

What is herein claimed as our invention, and which we desire to secure by Letters Patent, is—

1. The two sharp-pointed conically-shaped lifters $a$ $a$, arranged in a pair and adjustably attached to the two fenders or shields $b$ $b$, combined with a wheeled cultivator, arranged and operating as set forth.

2. In combination with the said lifters and fenders, constructed in pairs, as described, the vertical bars $d$ $d$, the screw-rod, and the spiral spring on the rod between the bars, constructed and arranged and operating as set forth.

WILLIAM H. GARDINER.
RUFUS AUSTIN.

Witnesses:
M. SIMMONS,
HENRY WINGART.